(12) United States Patent
Seehorn

(10) Patent No.: US 9,487,260 B1
(45) Date of Patent: Nov. 8, 2016

(54) MOTORCYCLE SLIDE PLATE SYSTEMS

(71) Applicant: SXSLIDEPLATE LLC, Fairfield, WA (US)

(72) Inventor: Jonathan Roy Seehorn, Fairfield, WA (US)

(73) Assignee: SXSLIDEPLATE LLC, Fairfield, WA (US)

( * ) Notice: Subject to any disclaimer, the term of this patent is extended or adjusted under 35 U.S.C. 154(b) by 0 days.

(21) Appl. No.: 14/788,115

(22) Filed: Jun. 30, 2015

(51) Int. Cl.
 *B62J 23/00* (2006.01)
 *B62K 11/02* (2006.01)

(52) U.S. Cl.
 CPC ............. *B62J 23/00* (2013.01); *B62K 11/02* (2013.01)

(58) Field of Classification Search
 CPC ................................. B62J 23/00; B62J 27/00
 See application file for complete search history.

(56) References Cited

U.S. PATENT DOCUMENTS

| | | | | |
|---|---|---|---|---|
| 7,588,009 | B2 * | 9/2009 | Kurokawa | B62M 7/02 123/193.5 |
| D740,719 | S * | 10/2015 | Schanz | D12/114 |
| 2008/0054597 | A1 * | 3/2008 | Becker | B62J 23/00 280/304.3 |
| 2015/0314824 | A1 * | 11/2015 | LeBreton | B62J 23/00 280/304.3 |
| 2016/0031511 | A1 * | 2/2016 | Tomura | B62J 23/00 280/283 |

FOREIGN PATENT DOCUMENTS

| | | | | |
|---|---|---|---|---|
| JP | 2004175236 A | * | 6/2004 | |
| JP | EP 1424274 A2 | * | 6/2004 | ............. B62J 23/00 |

OTHER PUBLICATIONS

"Obie Link Guard Installation for Linkage Protection", retrieved on Jun. 5, 2015 at <<http://www.obielinkguard.com/installation/>>, 6 pages.

* cited by examiner

Primary Examiner — Kevin Hurley
(74) Attorney, Agent, or Firm — Lee & Hayes, PLLC

(57) ABSTRACT

A motorcycle slide plate system includes a second portion and a second portion covering a frame of a motorcycle and a linkage of a suspension system of the motorcycle. The second portion is arranged between the first portion and the linkage of the suspension system of the motorcycle. When the motorcycle traverses an obstacle, the first portion is displaced by the obstacle in a direction toward the linkage, and the second portion receives a force applied by the linkage, in the direction toward the displaced first portion. When displaced, the first portion and the second portion elastically deform between an unimpacted position to an impacted position to slideably displace the linkage of the suspension system of the motorcycle across obstacles.

18 Claims, 6 Drawing Sheets

MOTORCYCLE SLIDE PLATE SYSTEMS

BACKGROUND

Motorcycle slide plates exist for sliding a motorcycle across obstacles or preventing damage to the motorcycle when impacting obstacles. Some existing slide plates are arranged to cover either a frame of a motorcycle or a suspension linkage assembly of the motorcycle. However, these existing slide plates do not provide for sliding both the frame and the suspension linkage of a motorcycle across obstacles. For example, a slide plate covering a frame provides for sliding the frame across obstacles, but does not provide for sliding the suspension linkage across obstacles. Similarly, a slide plate covering a linkage provides for sliding the suspension linkage across obstacles, but does not provide for sliding the frame across obstacles.

Other existing slide plates are arranged to cover both a frame and a suspension linkage assembly of the motorcycle. For example, some existing slide plates cover both a frame and a suspension linkage behind the frame and protruding down past the frame for sliding the motorcycle across obstacles and preventing damage to the frame and the suspension linkage. However, these existing slide plates are susceptible to being compromised when impacting obstacles.

Accordingly there remains a need in the art for improved slide plate systems that cover both a frame and a suspension linkage for sliding motorcycles across obstacles, and are not compromised when impacting obstacles.

SUMMARY

This summary is provided to introduce simplified concepts of motorcycle slide plates, which are further described below in the Detailed Description. This summary is not intended to identify essential features of the claimed subject matter, nor is it intended for use in determining the scope of the claimed subject matter. Motorcycle slide plates according to this disclosure are configured to slide a motorcycle across obstacles. The motorcycle slide plates protect a linkage of a suspension of a motorcycle from being damaged and slideably displace the suspension linkage over obstacles.

In one example, a motorcycle slide plate includes a first portion and a second portion. The second portion is arranged between a portion of a guard member of the first portion and a linkage of a suspension of a motorcycle. When the motorcycle traverses an obstacle, the guard member is displaced by the obstacle in a direction toward the linkage, and the second portion receives a force applied by the linkage, in the direction toward the displaced guard member, on the second portion to prevent compromising the first portion and to slideably displace the linkage over the obstacle.

In another example, a motorcycle slide plate assembly is coupled to a frame of a motorcycle. The motorcycle slide plate assembly includes a first portion extending past the frame of the motorcycle to a position below a linkage member of a linkage assembly of the motorcycle protruding down past the frame. The motorcycle slide plate assembly also includes a second portion arranged between the first portion and the linkage member protruding down past the frame. When the motorcycle traverses an obstacle, the first portion is displaced by the obstacle in a direction up towards the linkage member protruding down past the frame, and the second portion receives a force applied by the linkage member protruding down past the frame, in the direction toward the displaced first portion on the second portion to prevent compromising the first portion and slideably displace the linkage member protruding down past the frame over the obstacle.

In another example, a motorcycle slide plate system includes a first portion including a linking guard and a second portion. The linkage guard of the first portion extends past a frame of the motorcycle and arrangeable at least under a linkage member of a suspension system of the motorcycle and the second portion is arrangeable between the linkage guard and the linkage member. The linkage guard is displaceable between an unimpacted position to an impacted position. When the linkage guard is displaceable from the unimpacted position to the impacted position, the linkage guard prevents the linkage member from contacting an obstacle impacting the linkage guard. And, when the linkage guard is in the impacted position the second portion receives a force applied by the linkage member, in the direction toward the displaced linkage guard, on the second portion to prevent compromising the linkage guard and slideably displace the linkage member over the obstacle impacting the linkage guard.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
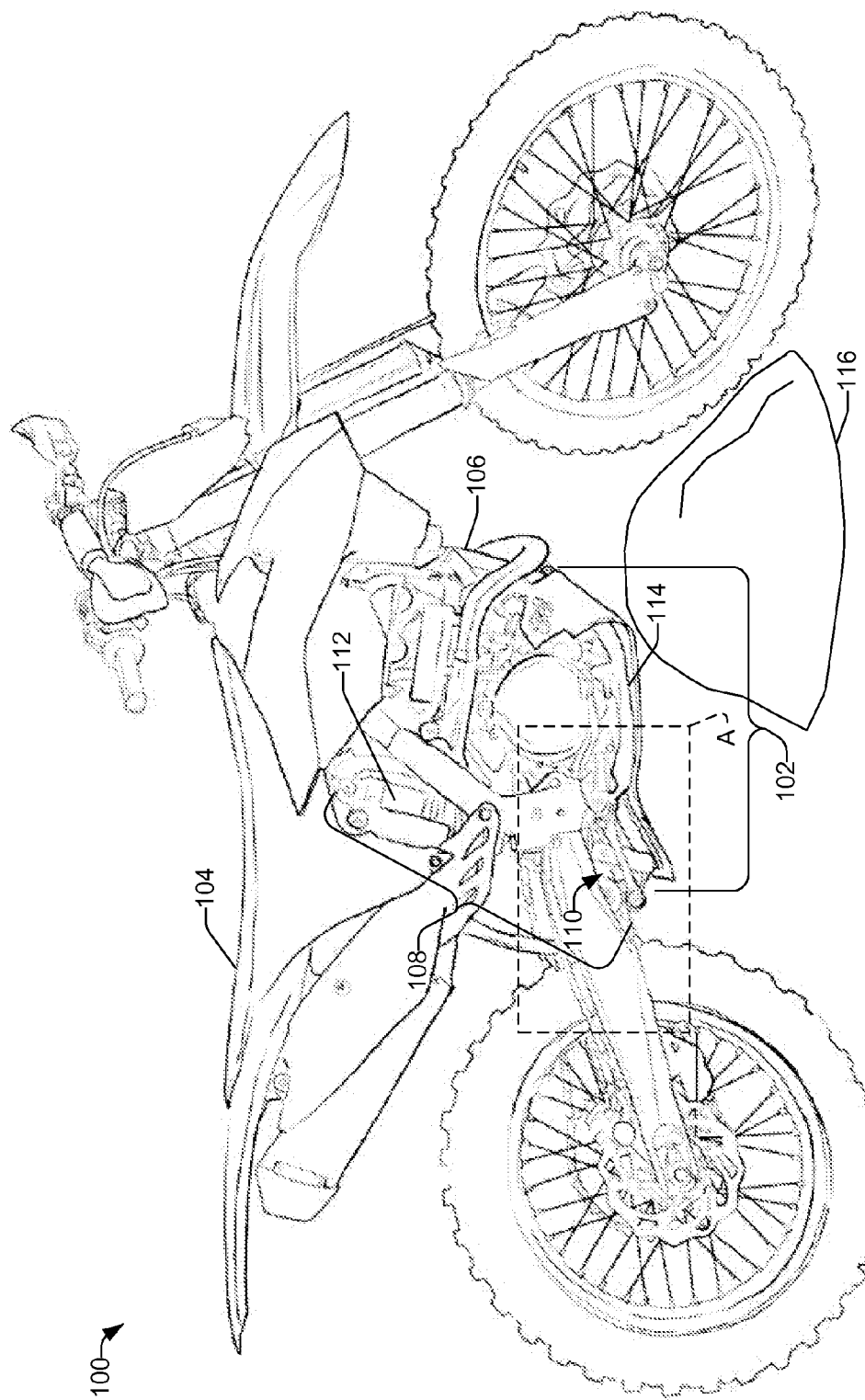
FIG. 1 illustrates a perspective view of an example motorcycle slide plate coupled to a motorcycle.

This disclosure is directed to motorcycle slide plates and systems that protect a linkage of a suspension system of a motorcycle from being damaged and slideably displace the suspension linkage over an obstacle when the motorcycle traverses the obstacle. For example, the motorcycle slide plates may include a first portion coupled to a frame of a motorcycle and a second portion arrangeable between the first portion and a linkage of a suspension system of the motorcycle. The first portion may include a guard member extending past a frame of the motorcycle to a position proximate to the linkage of the suspension system of the motorcycle, and arranged to be displaced by an obstacle in a direction toward the linkage. The second portion may receive a force applied by the linkage, in the direction toward the displaced guard member, on the second portion to prevent compromising the first portion and to slideably displace the linkage over the obstacle. For example, the second portion may be impacted between the linkage and the guard member to prevent compromising the guard member, and the second portion may elastically deform along with the guard member as the guard member is elastically deformed by the obstacle to slideably displace the linkage over the obstacle.

The motorcycle slide plates may include a first portion formed of a single unit of material and/or a second portion formed of another single unit of material arranged to elastically deform and have a very low coefficient of friction. For example, the first portion and/or the second portion may be formed of a single unit of plastic, metal or composite arranged to be displaced by an impacting obstacle and arranged to slide across an impacting obstacle.

The motorcycle slide plates may include a first portion having a linkage guard that is displaceable between an unimpacted position to an impacted position and a second portion arrangeable between the linkage guard and a linkage member of a suspension system of a motorcycle. For example, the first portion may include a linkage guard that is displaceable from the unimpacted position to the impacted position to prevent the linkage member from contacting an obstacle impacting the linkage guard and the second portion may receive a force applied by the linkage member to prevent the linkage member from compromising the linkage guard and to slideably displace the linkage member over the obstacle impacting the linkage guard. The second portion may be displaceable from the unimpacted position to the impacted position and elastically deform between the unimpacted position and the impacted position, and vice versa. For example, the second portion may be displaced as a result of the linkage guard being displaced by the obstacle impacting the linkage guard. Moreover, the second portion may elastically deform between the unimpacted position and the impacted position. For example, the second portion may elastically deform as a result of the linkage guard elastically deforming over the obstacle impacting the linkage guard.

These and other aspects of the motorcycle slide plates will be discussed below with reference to the figures.

Illustrative Motorcycle Slide Plates

FIG. 1 illustrates a perspective view 100 of an example motorcycle slide plate 102 coupled to a motorcycle 104. The motorcycle slide plate 102 may be coupled to a frame 106 of the motorcycle 104. For example, the motorcycle slide plate 102 may be coupled to a central frame of a motorcycle that receives at least a portion of an engine of the motorcycle 104. While FIG. 1 illustrates the motorcycle 104 being a dirt bike for off-road use (e.g., Enduro bike, Endurocross bike, Motocross bike, Super Moto bike, Supercross bike, Freestyle bike, Trials bike, etc.), the motorcycle 104 may be a dual-purpose bike, on/off road bike, street bike, cruiser bike, sport bike, touring bike, sport touring bike, etc.

The motorcycle 104 may have a suspension system 108 coupled to the frame 106 of the motorcycle 104. The suspension system 108 may have a linkage assembly 110 for coupling with a rear shock 112 of the motorcycle 104. The linkage assembly 110 may have one or more linkages arranged below a bottom surface 114 of the motorcycle. For example, one or more linkages of the linkage assembly 110 may be arranged below a bottom portion of the frame 106 of the motorcycle.

The motorcycle slide plate 102 may provide for slideably displacing the linkage assembly 110 over an obstacle 116 on a surface (e.g., ground, floor, deck, etc.). For example, the motorcycle 104 may be operated by a user (e.g., a rider) in an uncontrolled environment (e.g., outside in woodlands, forests, deserts, beaches, etc.) and/or in controlled environments (e.g., indoor and/or outdoor off-road motorcycle race courses) having natural or man-made obstacles (e.g., rocks, cobbles, boulders, logs, tires, concrete blocks, concrete slabs, wood blocks, wood planks, bricks, etc.) that the user may operate the motorcycle 104 over.

In one example, the motorcycle 104 may be operated by a user in an Endurocross motorcycle competition where the user operates the motorcycle on a track having one or more of hard rock sections (e.g., a length of a group of rocks), wooden sections (e.g., a length of a group of pieces of wood), rocks, boulders, logs, sand, mud, water-holes, and tires as obstacles for the user to operate the motorcycle over. The user may slideably displace the motorcycle across one or more of the obstacle. For example, the user may operate the motorcycle over a rock, a log, a tire, etc., such that the motorcycle impacts the rock, log, tire, etc. proximate to the bottom surface 114 of the motorcycle 104 and moves the motorcycle over the rock, log, tire, etc. while the motorcycle generally maintains contact with the rock, log, tire, etc. In this example, where the user operates the motorcycle over a rock, a log, a tire, etc., the motorcycle slide plate 102 provides for slideably displacing the linkage assembly 110 extending below the bottom surface 114 of the motorcycle over the rock, log, tire, etc. without the linkage assembly 110 grabbing (e.g., catching, snagging, clutching, seizing, etc.) the rock, log, tire, etc.

Figure 2:
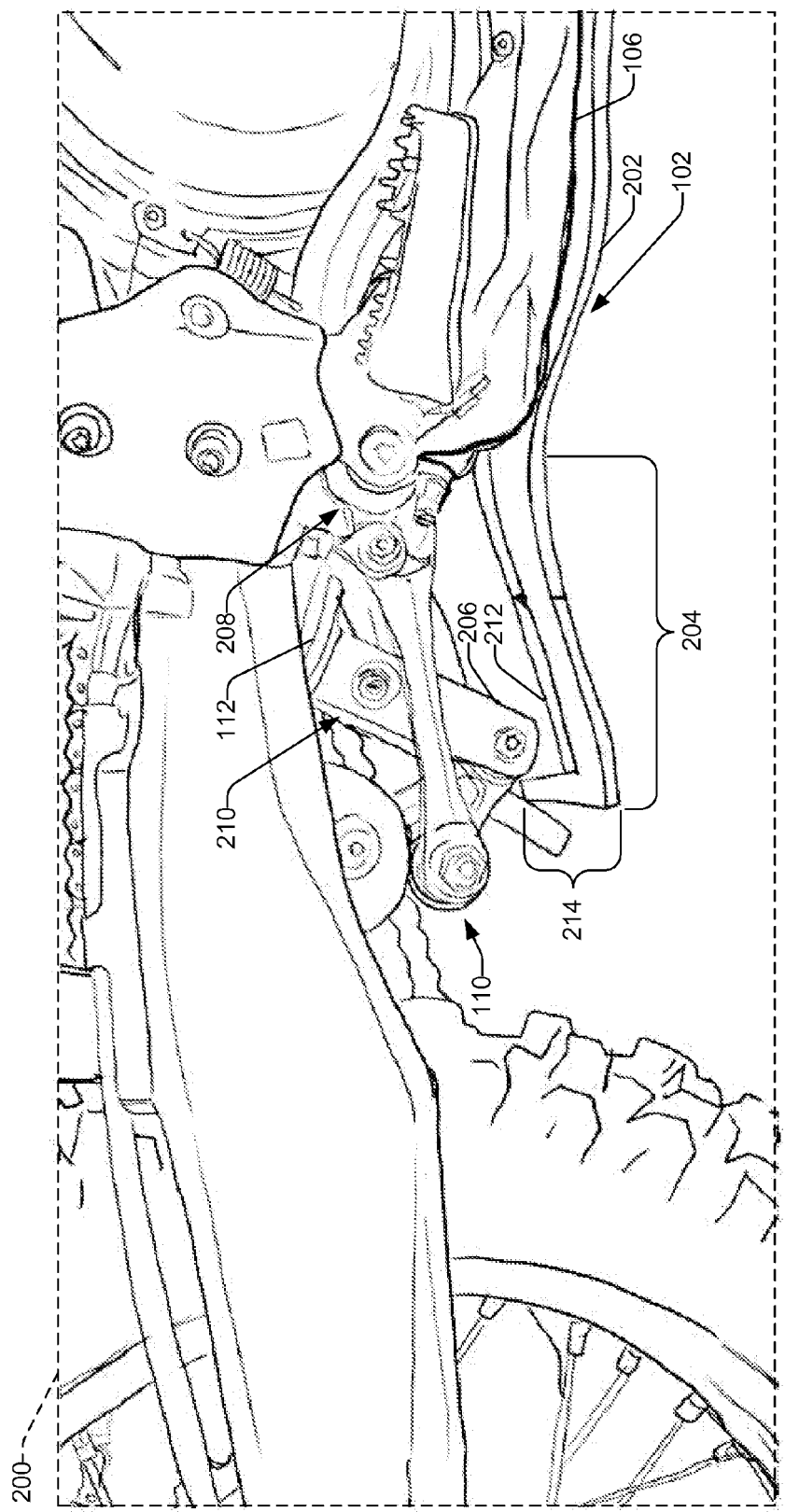
FIG. 2 illustrates a detail view of the example motorcycle slide plate coupled to the motorcycle illustrated in FIG. 1 in an impacted position taken at location A.

FIG. 2 illustrates a detail view 200 of the example motorcycle slide plate 102 coupled to the motorcycle 104 shown in the perspective view 100 of FIG. 1 taken at location A. Detail view 200 illustrates the motorcycle slide plate 102 including a first portion 202 coupled to the frame 106 of the motorcycle 104. The first portion 202 may include a guard member 204 extending past the frame 106. For example, the guard member 204 may extend a distance of at least about 3 inches to at most about 10 inches past a rear member 208 of the frame 106 that is coupled to the linkage assembly 110. In another example, the guard member 204 may extend at least about 6 inches past a rear member 208 of the frame 106. The guard member 204 may extend past the frame 106 to a position proximate to the linkage assembly 110 of the suspension system 108 of the motorcycle 104. For example, the guard member 204 may extend past the frame 106 to a position below the linkage assembly 110 of the suspension system 108 of the motorcycle 104.

FIG. 2 illustrates the linkage assembly 110 may include a linkage member 206 protruding down past the frame 106. For example, the linkage member 206 may protrude a distance of at least about ½ inches to at most about 6 inches below the rear member 208 of the frame that is coupled to the linkage assembly 110. In another example the linkage member 206 may protrude a distance of at least about 3 inches below the rear member 208 of the frame 106 that is coupled to the linkage assembly 110. The rear member 208 may be a structural section of the frame 106 arranged across the rear of the frame 106. The linkage member 206 may be coupled to a bottom end 210 of the rear shock 112 opposite a top end of the rear shock 112. While FIG. 2 illustrates the bottom end 210 of the rear shock 112 coupled to the linkage member 206, the rear shock 112 may not couple to the linkage member 206. For example, the bottom end 210 of the rear shock 112 may have an elongated linkage member arranged to extend down past the frame 106 to couple to the linkage assembly. For example, the elongated linkage member of the shock may extend down past the frame 106 and couple to a linkage member of the linkage assembly 110 arranged down below the frame 106.

Detail view 200 illustrates the motorcycle slide plate 102 includes a second portion 212. The second portion 212 may be arrangeable between at least a portion of the guard member 204 and the linkage member 206. For example, the second portion 212 may be coupleable to the frame 106 (e.g., the rear member 208 of the frame 106) and/or coupleable to the first portion 202 and extend a distance of at least about 3 inches to at most about 10 inches past the frame 106 to a position between the linkage member 206 and the guard member 204. In another example, the second portion 212 may be coupleable to the frame 106 (e.g., the rear member 208 of the frame 106) and/or coupleable to the first portion 202 and extend a distance of at least about 6 inches past the frame 106 to a position between the linkage member 206 and the guard member 204.

Detail view 200 illustrates the motorcycle slide plate 102 in an impacted position 214. For example, when the motorcycle 104 traverses an obstacle (e.g., obstacle 116), the guard member 204 of the first portion 202 may be displaced by the obstacle in a direction 216 up towards the linkage member 206 protruding down past the frame 106, and the second portion 212 receives a force applied by the linkage member 206 protruding down past the frame, in the direction toward the displaced guard member 204, on the second portion 212 to prevent compromising the guard member 204 and slideably displace the linkage member 206 protruding down past the frame over the obstacle. Stated otherwise, the guard member 204 may be displaced from an unimpacted position (illustrated in FIG. 3) to the impacted position 214, where the second portion 212 is sandwiched between the linkage member 206 and the guard member 204 and receives an impacting force from the linkage member 206. Because the second portion 212 receives the force from the linkage member 206, the second portion 212 prevents the linkage member 206 from compromising the guard member 204.

Further, the second portion 212 may be displaceable from the unimpacted position (illustrated in FIG. 3) to the impacted position 214 and elastically deform between the unimpacted position and the impacted position 214, and vice versa. For example, the second portion 212 may elastically deform between the unimpacted position and the impacted position 214 as a result of the guard member 204 elastically deforming over the obstacle impacting the guard member 204. Moreover, because the guard member 204 may be formed of a material having a very low coefficient of friction (e.g., Ultra-high-molecular-weight polyethylene (UHMW)) the guard member 204 may provide for slideably displacing the linkage member 206 across the obstacle without the obstacle grabbing (e.g., catching, snagging, clutching, seizing, etc.) the guard member 204. Further, because the second portion 212 may be formed of the same material having a very low coefficient of friction (e.g., UHMW) the second portion 212 may provide for elastically deforming between the unimpacted position and the impacted position 214 as a result of the guard member 204 elastically deforming over the obstacle impacting the guard member 204. For example, because the second portion 212 may be formed of the same material having a very low coefficient of friction (e.g., UHMW), when the guard member 204 elastically deforms the second portion 212 may slide against the guard member 204 as the second portion 212 elastically deforms with the deforming guard member 204. Because the guard member 204 and the second portion 212 may elastically deform and slide against one another, the guard member 204 and the second portion 212 provide for slideably displacing the linkage member 206 across obstacles.

Figure 3:
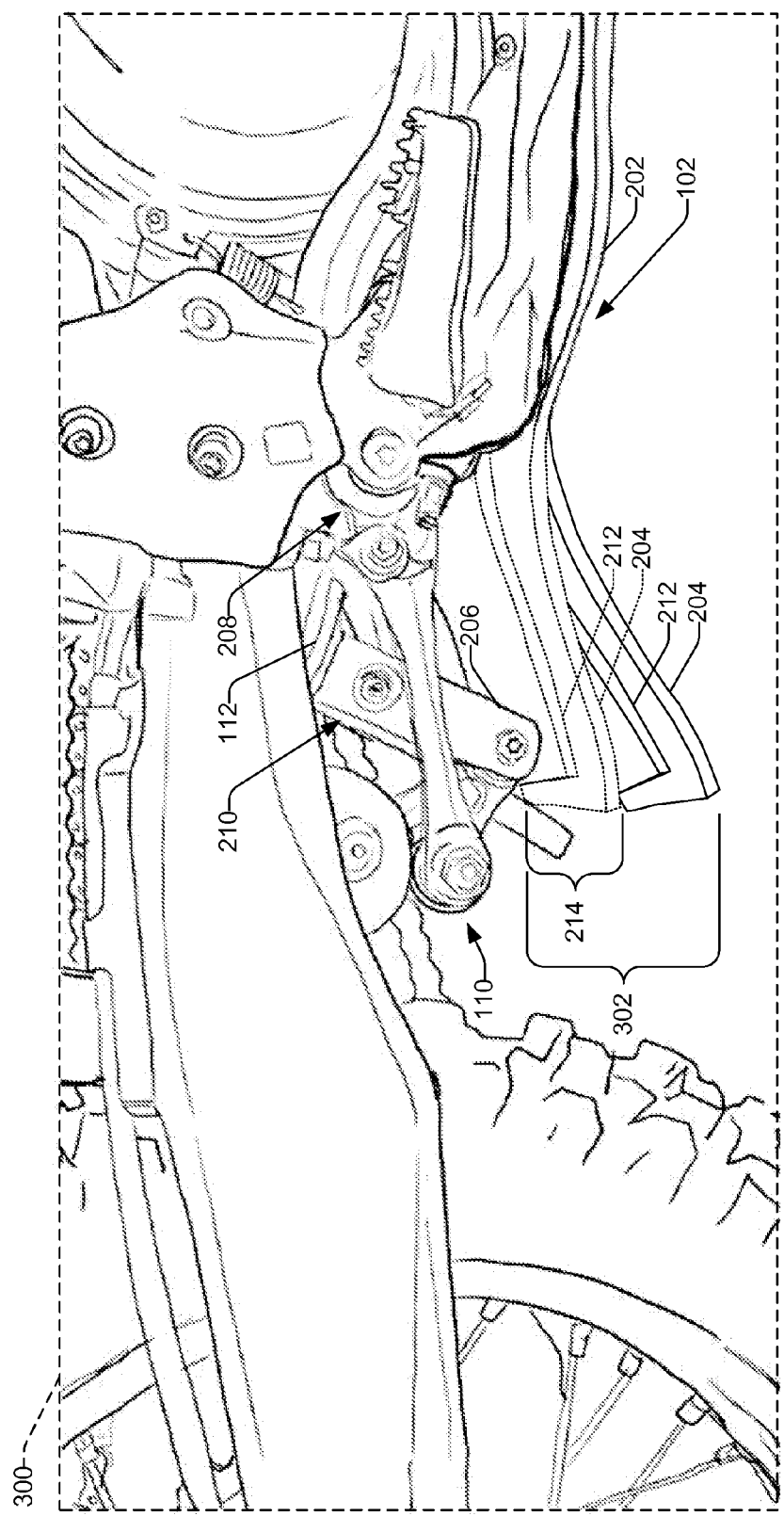
FIG. 3 illustrates a detail view of the example motorcycle slide plate coupled to the motorcycle illustrated in FIG. 1 in an unimpacted position taken at location A.

FIG. 3 illustrates a detail view 300 of the example motorcycle slide plate 102 coupled to the motorcycle 104 shown in the perspective view 100 of FIG. 1 taken at location A. Detail view 300 illustrates the motorcycle slide plate 102 in an unimpacted position 302. For example, detail view 300 illustrates the guard member and the second portion 212 arranged down away from the linkage assembly 110. The slide plate 102 may be arranged in the unimpacted position 302 before impacting an obstacle (e.g., obstacle 116). The guard member 204 may be displaced from the unimpacted position 302 to the impacted position 214, where the second portion 212 is sandwiched between the linkage member 206 and the guard member 204 and receives an impacting force from the linkage member 206. The second portion 212 and the guard member 204 may be elastically deform between the unimpacted position 302 and the impacted position 214, and vice versa.

Figure 4:
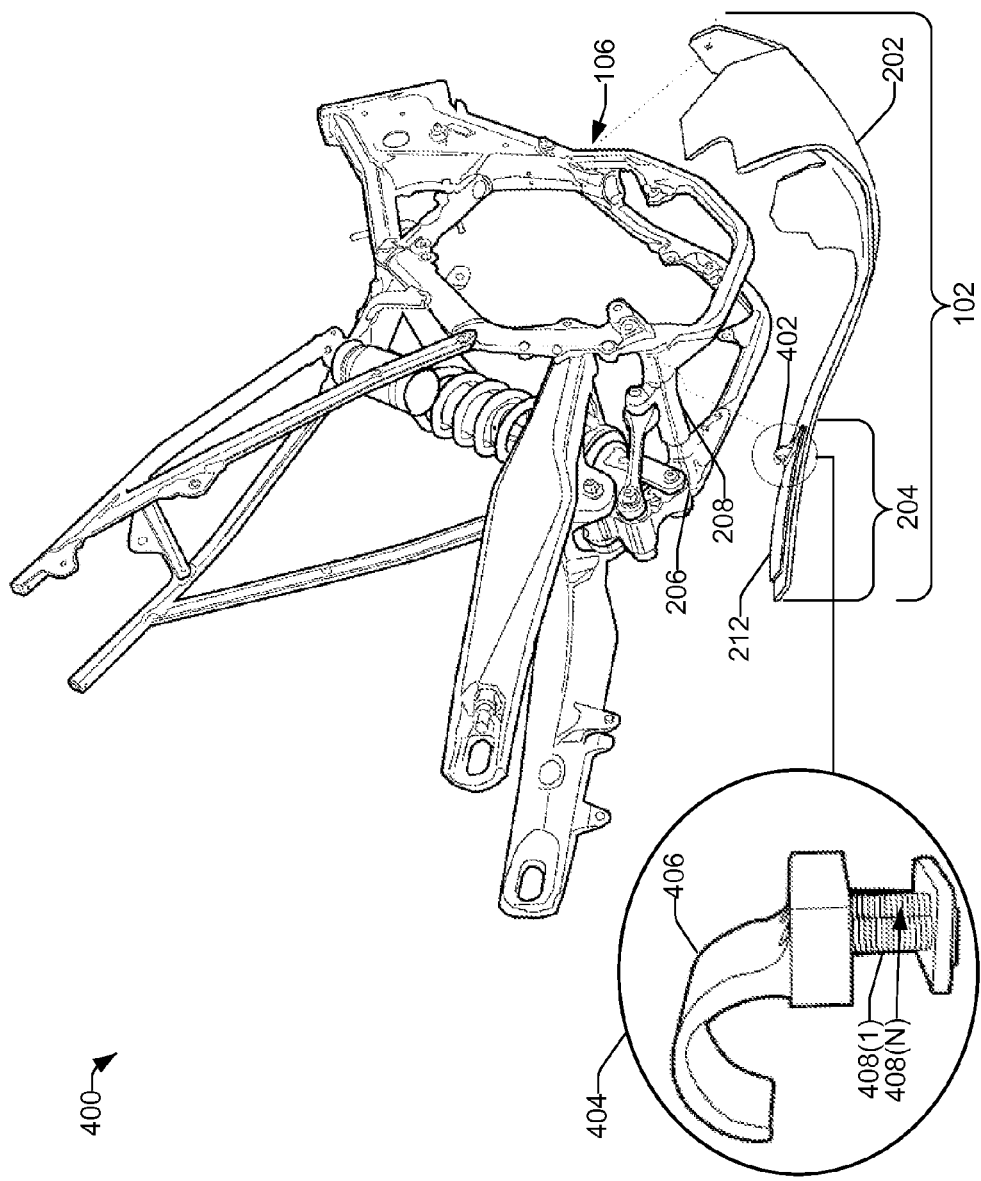
FIG. 4 illustrates a perspective view of the example motorcycle slide plate uncoupled from a frame of the motorcycle illustrated in FIG. 1.

FIG. 4 illustrates a perspective view 400 of the example motorcycle slide plate 102 uncoupled from the frame 106 of the motorcycle 104 illustrated in FIG. 1. FIG. 4 illustrates the motorcycle slide plate 102 may include a fastener 402 arranged with the motorcycle slide plate 102 for coupling at least a portion of the motorcycle slide plate 102 to the rear member 208 of the frame 106. For example, the fastener 402 may be fixed to the second portion 212 and/or the first portion 202. In one example, the fastener 402 may be fixed to the second portion 212 and arranged to couple to the rear member 208 of the frame 106.

Detail view 404 shows the fastener 402 may comprise a hook 406 arranged to fasten to the rear member 208 of the frame 106. For example, the hook 406 may be positioned around an outside diameter of the rear member 208 and one or more threaded fasteners 408(1) and 408(N) may clamp the hook 406 and the guard member 204 to the rear member 208. While FIG. 4 illustrates the fastener 402 comprising a hook 406, the fastener 402 may comprise one or more threaded fasteners (e.g., threaded bolts), snap-fit fasteners, press-fit fasteners, adhesive fasteners, hook-and-loop fasteners, etc.

In one example, to install the motorcycle slide plate 102 to the motorcycle 104 a user may first couple the second portion 212 to the frame 106 and then install the first portion 202 to the frame, arranging the second portion 212 between the first portion 202 and the linkage member 206 protruding down past the frame 106. In another example, to install the motorcycle slide plate 102 to the motorcycle 104 a user may assemble the first portion 202 to the second portion 212 and then couple the assembled motorcycle slide plate 102 to the frame 106 of the motorcycle 104, arranging the second portion 212 between the first portion 202 and the linkage member 206 protruding down past the frame 106.

Figure 5:
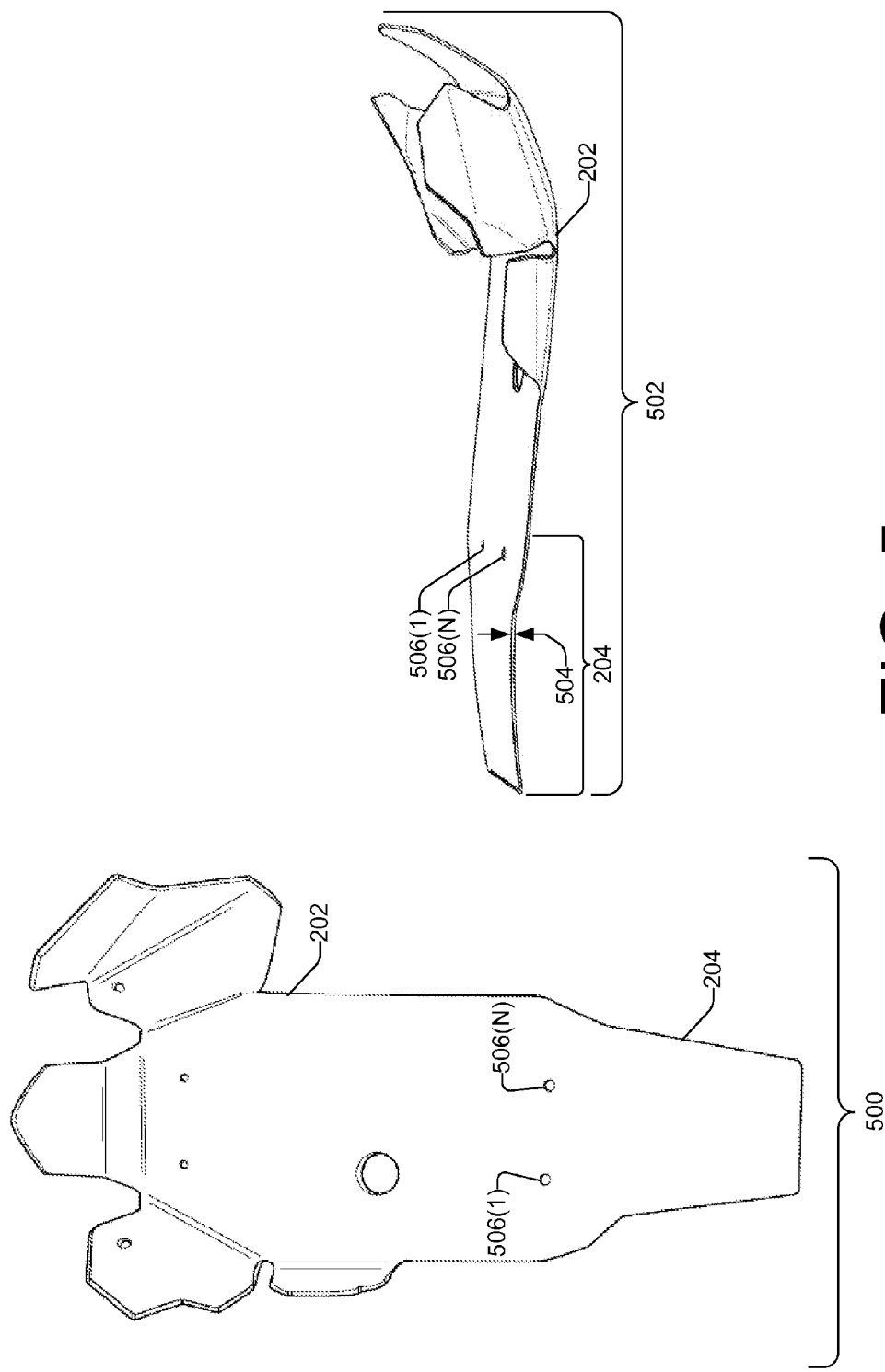
FIG. 5 illustrates a top view and side view of a first portion of the example motorcycle slide plate illustrated in FIG. 1.

FIG. 5 illustrates a top view 500 and side view 502 of the first portion 202 of the example motorcycle slide plate 102 illustrated in FIG. 1. FIG. 5 illustrates the first portion 202 may be formed of a single unit of material. For example, the first portion 202 may be formed of a single unit of plastic (e.g., synthetic plastic, organic plastic, semi-synthetic organic plastics), metal, composite (e.g., carbon fiber, carbon Kevlar, carbon graphite Kevlar), etc. In one example, the first portion 202 may be formed of a single unit of polyethylene (e.g., ultra-high-molecular-weight polyethylene (UHMW), high-density polyethylene (PEX), medium-density polyethylene (MDPE), linear low-density polyethylene (LLDPE), low-density polyethylene (LDPE), very-low-density polyethylene (VLDPE), etc.).

While FIG. 5 illustrates the first portion 202 may be formed of a single unit of material, the first portion 202 may be formed of multiple units of material. For example, the guard member 204 may be formed of a first single unit of material (e.g., polyethylene) and the remaining portion of the first portion 202 may be formed of a second single unit of material (e.g., polyethylene). For example, the guard member 204 formed of the first single unit of material may be fix to the remaining portion of the first portion 202 formed of the second single unit of material. In another example, the guard member 202 may be formed of first material different from a second material forming the remaining portion of the first portion 202. For example, the guard member 202 may be formed of a single unit of a composite (e.g., carbon Kevlar) and fixed to the remaining portion of the first portion 202 formed of a single unit of plastic (e.g., polyethylene). In another example, the guard member may be formed of one or more units of material and fixed and/or overmolded to remaining portion of the first portion 202.

FIG. 5 illustrates the first portion 202 may have a thickness 504 of at least about 1/8 inches to at most about 3/8 inches. For example, the guard member 204 and the remaining portion of the first portion 202 may each have a thickness 504 of at least about 1/8 inches to at most about 3/8 inches. In another example, the first portion 202 may have a thickness 504 of about 1/4 inches. The thickness 504 of the first portion 202 may provide for the guard member 204 to elastically deform between the unimpacted position 302 to the impacted position 214, and vice versa. The first portion 202 may be coated (e.g., painted, sprayed, chemically filmed, etc.) to further reduce the friction coefficient. The guard member 204 may have one or more apertures 506(1) and 506(N) for receiving one or more fasteners. For example, the guard member 204 may have one or more through holes for receiving at least a portion of the one or more threaded fasteners 408(1) and 408(N) of the fastener 402.

Figure 6:
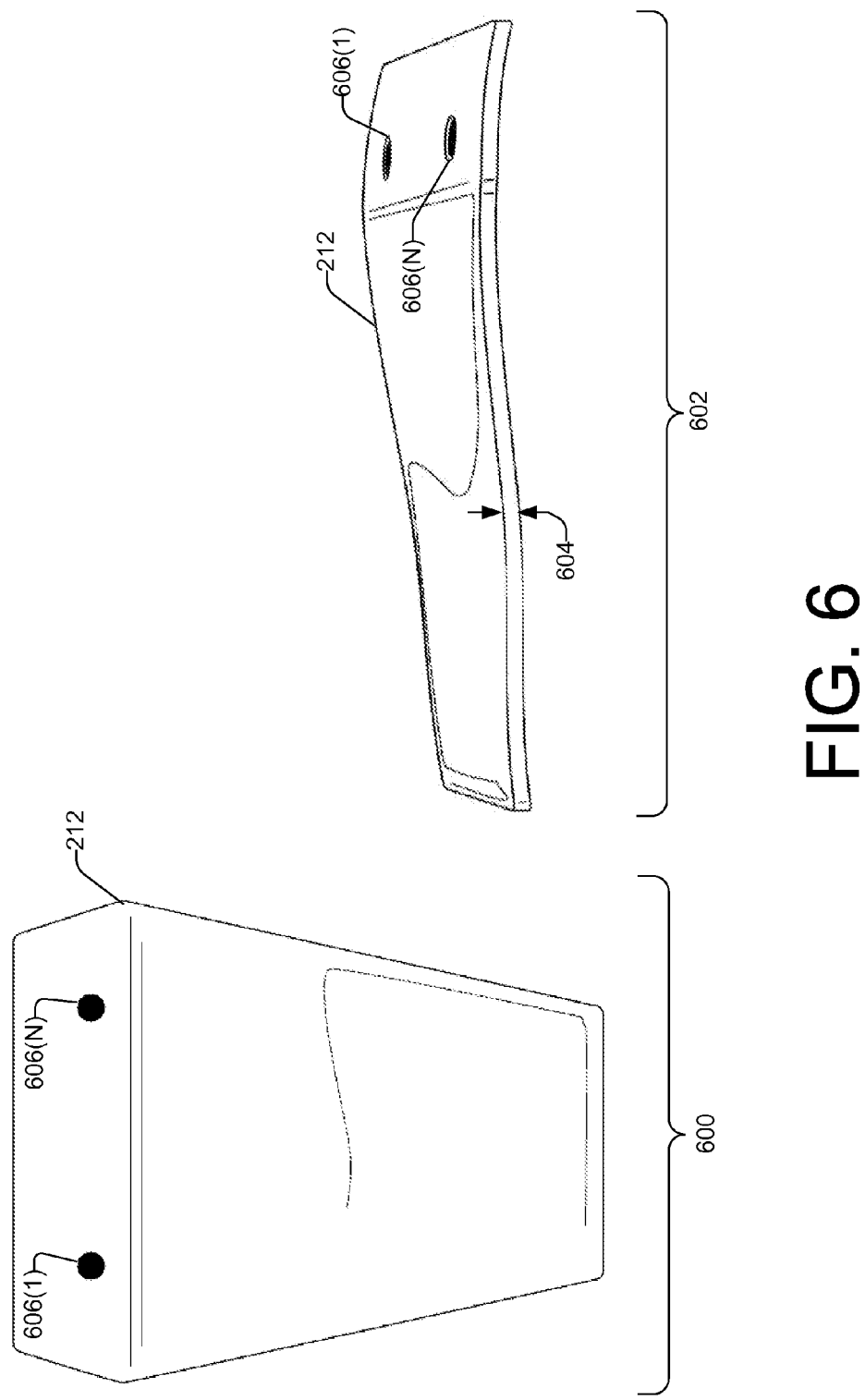
FIG. 6 illustrates a top view and side view of a second portion of the example motorcycle slide plate illustrated in FIG. 1.

FIG. 6 illustrates a top view 600 and side view 602 of the second portion 212 of the example motorcycle slide plate 102 illustrated in FIG. 1. FIG. 6 illustrates the second portion 212 may be formed of a single unit of material. For example, the second portion 212 may be formed of a single unit of plastic (e.g., synthetic plastic, organic plastic, semi-synthetic organic plastics), metal, composite (e.g., carbon fiber, carbon Kevlar, carbon graphite Kevlar), etc. In one example, the second portion 212 may be formed of a single unit of polyethylene (e.g., ultra-high-molecular-weight polyethylene (UHMW), high-density polyethylene (PEX), medium-density polyethylene (MDPE), linear low-density polyethylene (LLDPE), low-density polyethylene (LDPE), very-low-density polyethylene (VLDPE), etc.).

FIG. 6 illustrates the second portion 212 may have a thickness 604 of at least about 1/8 inches to at most about 3/8 inches. In another example, the second portion 212 may have a thickness 604 of about 1/4 inches. The thickness 604 of the second portion 212 may provide for the second portion 212 to elastically deform between the unimpacted position 302 to the impacted position 214, and vice versa. For example, the thickness 604 of the second portion 212 may provide for the second portion 212 to elastically deform with the deforming guard member 204 when the guard member 204 elastically deforms over an obstacle. The second portion 212 may be coated (e.g., painted, sprayed, chemically filmed, etc.) to further reduce the friction coefficient. The second portion 212 may have one or more apertures 606(1) and 606(N) for receiving one or more fasteners. For example, the guard member 204 may have one or more through holes for receiving at least a portion of the one or more threaded fasteners 408(1) and 408(N) of the fastener 402.

CONCLUSION

Although the invention has been described in language specific to structural features and/or methodological acts, it is to be understood that the invention is not necessarily limited to the specific features or acts described. Rather, the specific features and acts are disclosed as illustrative forms of implementing the invention. For example, while embodiments are described having certain shapes, sizes, and configurations, these shapes, sizes, and configurations are merely illustrative.

What is claimed is:

1. A motorcycle slide plate comprising:
    a first portion coupleable to a frame of a motorcycle, the first portion formed of a first single unit of plastic and including a guard member extending past the frame to a position proximate to a linkage of a suspension system of the motorcycle; and
    a second portion arrangeable between at least a portion of the guard member and the linkage, the second portion formed of a second single unit of plastic,
    wherein when the motorcycle traverses an obstacle, the guard member is displaced by the obstacle in a direction toward the linkage, and the second portion receives a force applied by the linkage, in the direction toward the displaced guard member, on the second portion to prevent compromising the first portion and to slideably displace the linkage over the obstacle.

2. The motorcycle slide plate of claim 1, wherein the plastic forming the first portion or the second portion comprises polyethylene.

3. The motorcycle slide plate of claim 2, wherein the polyethylene forming the first portion or the second portion comprises Ultra-high-molecular-weight polyethylene (UHMW).

4. The motorcycle slide plate of claim 3, wherein the Ultra-high-molecular-weight polyethylene (UHMW) forming the first portion or the second portion has a thickness of at least about 1/8 inches to at most about 3/8 inches.

5. A motorcycle comprising:
    a frame;
    a linkage assembly for coupling with a rear shock of the motorcycle, the linkage assembly including a linkage member protruding down past the frame; and
    a slide plate assembly coupled to the frame, the slide plate assembly comprising:
    a first portion extending past the frame to a position below the linkage member protruding down past the frame, the first portion formed of a first single unit of plastic; and
    a second portion arranged between the first portion and the linkage member protruding down past the frame, the second portion formed of a second single unit of plastic,
    wherein when the motorcycle traverses an obstacle, the first portion is displaced by the obstacle in a direction up towards the linkage member protruding down past the frame, and the second portion receives a force applied by the linkage member protruding down past the frame, in the direction toward the displaced first portion, on the second portion to prevent compromising the first portion and slideably displace the linkage member protruding down past the frame over the obstacle.

6. The motorcycle of claim 5, wherein the linkage member protruding down past the frame of the motorcycle is at least coupled to a bottom end of the rear shock opposite a top end of the rear shock.

7. The motorcycle of claim 5, wherein the first single unit of plastic comprises polyethylene and the second single unit of plastic comprises polyethylene.

8. The motorcycle slide plate of claim 7, wherein the polyethylene forming the first single unit of plastic or the second single unit of plastic comprises Ultra-high-molecular-weight polyethylene (UHMW).

9. A slide plate system for coupling to a motorcycle, the slide plate system comprising:
 a first portion including a linkage guard extending past a frame of the motorcycle and arrangeable at least under a linkage member of a suspension system of the motorcycle, the linkage guard displaceable between an unimpacted position to a impacted position; and
 a second portion arrangeable between at least the linkage guard and the linkage member,
 wherein the linkage guard is displaceable from the unimpacted position to the impacted position to prevent the linkage member from contacting an obstacle impacting the linkage guard, and
 wherein when the linkage guard is in the impacted position the second portion:
  receives a force applied by the linkage member, in the direction toward the displaced linkage guard, on the second portion to prevent compromising the linkage guard; and
  slideably displaces against the displaced linkage guard as the second portion deforms along with the linkage guard from impacting with the obstacle; and
 at least the linkage guard and the second portion slideably displace the linkage member over the obstacle impacting the linkage guard.

10. The slide plate system of claim 9, wherein at least the linkage guard elastically deforms between the unimpacted position and the impacted position, and vice versa.

11. The slide plate system of claim 9, wherein at least the linkage guard comprises plastic.

12. The slide plate system of claim 11, wherein the plastic has a thickness of at least about ⅛ inches to at most about ⅜ inches.

13. The slide plate system of claim 9, wherein the first portion and the linkage guard are formed of a single unit of polyethylene.

14. The slide plate system of claim 9, wherein the second portion is displaceable from the unimpacted position to the impacted position, and the second portion elastically deforms between the unimpacted position and the impacted position, and vice versa.

15. The slide plate system of claim 9, wherein the second portion comprises plastic.

16. The slide plate system of claim 15, wherein the plastic has a thickness of at least about ⅛ inches to at most about ⅜ inches.

17. The slide plate system of claim 9, wherein the second portion is formed of a single unit of polyethylene.

18. The slide plate system of claim 9, wherein the first portion or the second portion comprises a composite.

* * * * *